United States Patent [19]

Fiorentzis

[11] 4,149,208
[45] Apr. 10, 1979

[54] METHOD OF AND APPARATUS FOR GROUND FAULT PROTECTION OF GENERATORS CONNECTED IN PARALLEL

[75] Inventor: Michael Fiorentzis, Wettingen, Switzerland

[73] Assignee: BBC Brown, Boveri & Company Limited, Baden, Switzerland

[21] Appl. No.: 875,692

[22] Filed: Feb. 6, 1978

[30] Foreign Application Priority Data

Mar. 1, 1977 [CH] Switzerland ............................ 2549/77

[51] Int. Cl.² .............................................. H02H 3/16
[52] U.S. Cl. ...................................... 361/42; 324/51; 361/20; 361/44; 361/47; 340/650
[58] Field of Search .................... 361/42, 44, 45, 46, 361/47, 48, 49, 50, 78, 79, 85, 20, 21; 324/51; 340/650, 651

[56] References Cited

U.S. PATENT DOCUMENTS

| 3,978,465 | 8/1976 | Goode ................................... 340/651 |
| 4,106,071 | 8/1978 | Sun et al. ............................... 361/79 |

FOREIGN PATENT DOCUMENTS

| 1059095 | 6/1959 | Fed. Rep. of Germany ............. 361/47 |
| 1463574 | 1/1971 | Fed. Rep. of Germany. |
| 44-2644 | 1/1965 | Japan ........................................ 361/42 |
| 446499 | 3/1968 | Switzerland. |
| 838513 | 6/1960 | United Kingdom ....................... 361/47 |
| 543076 | 1/1975 | U.S.S.R. ................................... 361/42 |

*Primary Examiner*—Harry E. Moose, Jr.
*Attorney, Agent, or Firm*—Werner W. Kleeman

[57] ABSTRACT

A method of, and apparatus for, protecting electrical devices, such as generators connected in parallel against ground faults or shorts, wherein when there arises a ground short at one of the parallely connected generators a ground or earth current (response signal) flows between the fault location and a ground location. The network is grounded at the ground location by means of a ground transformer and a ground resistance. In order to essentially completely detect the ground short the phase of an alternating signal is modulated to produce an alternating injection or test signal which is delivered to the network containing the parallely connected generators. A response signal corresponding to the injection signal and indicative of the ground short is derived from the electrical network. The modulated alternating signal may be at the network frequency and modulation of the phase thereof preferably encompasses continuously switching the phase of the alternating signal between two phase positions in the sense of a phase oscillation. The alternating signal is preferably in the form of an alternating voltage.

22 Claims, 4 Drawing Figures

METHOD OF AND APPARATUS FOR GROUND FAULT PROTECTION OF GENERATORS CONNECTED IN PARALLEL

BACKGROUND OF THE INVENTION

The present invention broadly relates to ground fault protection of parallel connected generators of an electrical network, and, more specifically, is concerned with a new and improved method of, and apparatus for, detecting ground shorts in an electrical network containing generators connected in parallel, wherein in the presence of a ground short at the generator a ground or earth current flows between the fault location and a ground location disposed at a suitable place or site, and the electrical network at the ground location is grounded by means of a ground transformer and a ground resistance or resistor.

In order to selectively protect generators connected directly with a busbar against ground shorts, present day technology employs a null current measurement at the generator output side. For explanatory purposes reference is made to a prior art ground fault protection system as shown in FIG. 1, wherein in the presence of a ground short at one of the generators a ground or earth current Iw flows between the fault location and a ground location E disposed at a suitable place or site. At the ground location E the electrical network 1 is grounded with the aid of a ground transformer 120 through a ground resistor Ra and Rb respectively. The current Iw is a purely active current. Advantageously, it is measured at location A by means of a directional relay RR. By means of this directional relay RR there are likewise filtered out the capacitive currents flowing at location A. The site of the ground resistor Ra or Rb is dependent upon the specific grounding technique. With all of the state-of-the-art methods the current Iw however cannot be chosen to be smaller than the fault currents If of the null current converter. The present day conventional ground active currents Iw require complicated ground transformers and other ground elements, such as ground protective devices and ground resistances.

A further drawback of all of these prior art techniques resides in the fact that the ground short-active current Iw, and therefore, also the measurement time, decreases when the ground short has shifted towards the star point of the electrical machine.

SUMMARY OF THE INVENTION

It is a primary object of the present invention to provide an improved method of, and apparatus for, protecting parallely connected electrical devices against ground shorts, in a manner not associated with the aforementioned drawbacks and limitations of the prior art proposals.

Another and more specific object of this invention aims at avoiding the drawbacks of existing methods for ground short protection of the stators of generators and rendering possible filtering of the useful current from a mixture of disturbance currents which are of random shape or configuration within certain limits, by using relatively simple means.

Now in order to implement these and still further objects of the invention, which will become more readily apparent as the description proceeds, the method of the present invention for detecting ground shorts at generators connected in parallel in an electrical network contemplates modulating the phase of an alternating signal to produce an alternating injection or test signal which is then delivered to the electrical network containing the generators connected in parallel. A response signal corresponding to the injection signal and indicitive of a ground short at one of the generators is derived from the electrical network. The response signal then can be beneficially utilized to actuate a protective device, such as a relay, in order to shut-off the electrical network or other object to be protected. The alternating signal is preferably in the form of an alternating voltage. The modulated alternating signal is preferably at the network frequency, although this is not absolutely necessary, since such constitutes an advantageous and simple manner of deriving the injection signal from the network. Modulation of the phase of the alternating signal advantageously may encompass continuously switching the phase of the alternating signal between two phase positions in the sense of a phase oscillation. The entire network is biased towards ground by means of the injection voltage or signal.

As already eluded to above, the invention is not only concerned with the aforementioned method aspects, but also relates to apparatus for the performance thereof, which apparatus is manifested by the features that there is provided a transformer having two primary windings and a secondary winding, the secondary winding of which serves for biasing or shifting the object to be protected, here for instance the electrical network containing the parallely connected generators, towards ground. This secondary winding serves to apply the modulated alternating signal providing the alternating injection or test signal to the electrical network. This alternating injection signal, typically in the form of the injection voltage, is derived from a source which advantageously works at the network frequency, although it need not necessarily be operating at such network frequency. This signal source or voltage source is connected at one terminal or pole with the connection point or junction of both primary windings of the transformer and at the other terminal or pole thereof is connected in parallel with the inputs of two electronic switches, the outputs of which are connected in each case with a respective free end i.e. the other terminal of the respective primary windings. Both of the electronic switches are alternately opened at their control electrodes by the output signals of an oscillator. A working resistor is connected in parallel with the primary winding of an insulating transformer defining a response signal transformer, the secondary winding of which is connected with one input of a multiplier. At another input of the multiplier there appears as the reference frequency a voltage corresponding to the supply voltage of the source. At the output of the multiplier there appears an output signal which is delivered to a filter which performs an integration operation.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
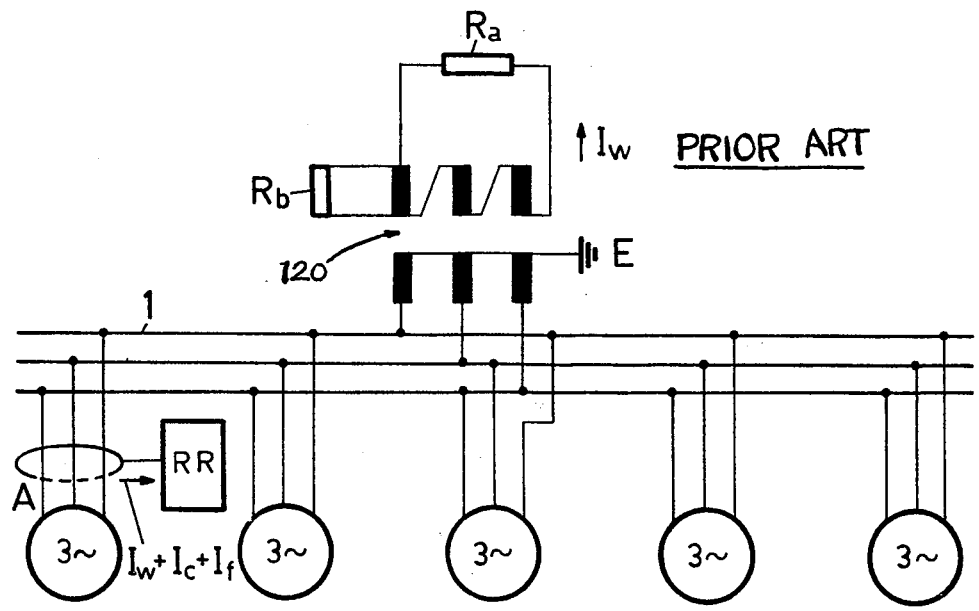
FIG. 1 is a circuit diagram showing a prior art arrangement for protecting parallely connected generators against ground shorts.

Describing now the drawings, in FIG. 1 there is illustrated purely as background information a prior art technique for protecting generators connected in parallel at an electrical network 1 against ground shorts. As mentioned heretofore, this state-of-the-art techniques relies upon measurement of the null current at the generator output side. Upon occurrence of a ground short at one of the generators, such as the generator appearing at the left-hand side of FIG. 1, a ground or earth current Iw flows between the fault location and a ground location E disposed at a suitable point of place. At the ground location E the electrical network 1 is grounded by means of the ground transformer 120 through a respective ground resistor Ra and Rb. This current Iw, which is a purely active current, is advantageously measured at location A with the aid of a directional relay RR. By means of the directional relay RR there is filtered out the capacitive currents flowing at the location A. The site of the ground resistor Ra or Rb is dependent upon the specific grounding technique. With all the prior art methods the current Iw cannot be chosen to be smaller than the fault currents If of the null current converter. The present day conventional ground short-active currents Iw, as equally mentioned heretofore, require complicated ground transformers and other ground elements, such as for instance ground protection devices and ground resistances.

Figure 2:
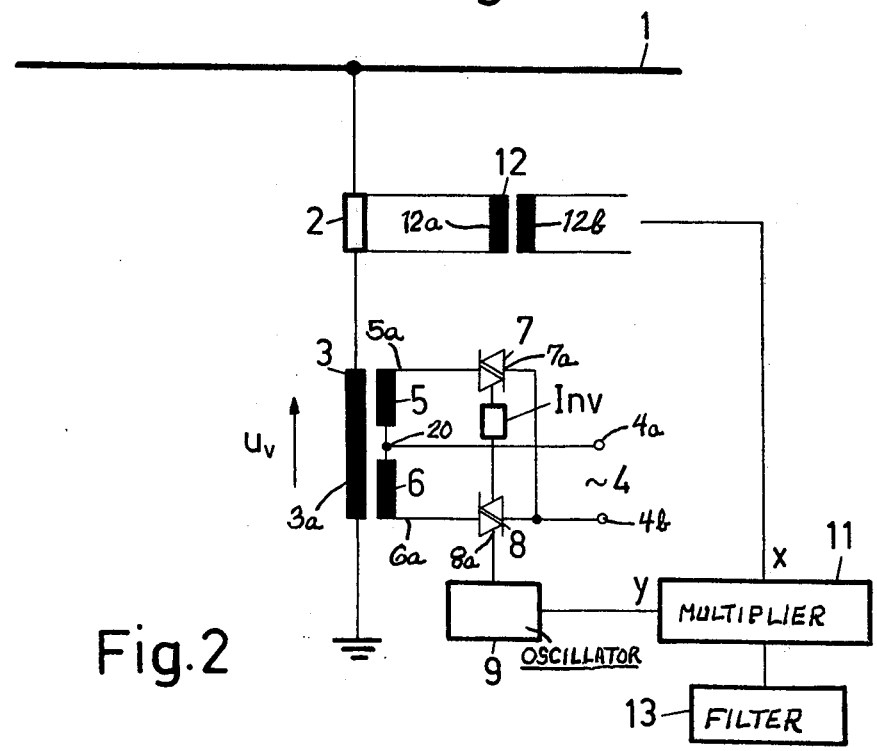
FIG. 2 is a circuit diagram of an arrangement constructed according to the present invention, suitable for the practice of the method aspects thereof, and serving for detecting ground shorts in generators connected in parallel in an electrical network.
Figure 4:
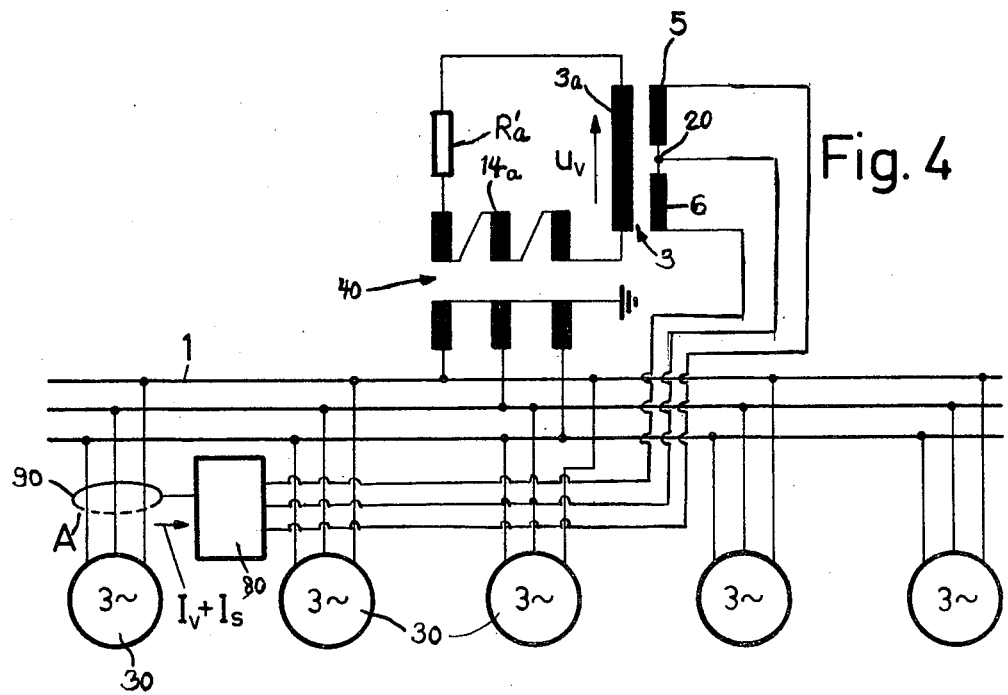
FIG. 4 is a circuit diagram showing the connection of the phase oscillation of the arrangement of FIG. 2 with the electrical network 1 containing the parallely connected generators.

Continuing, now in FIG. 2 there has been illustrated the functional principle of the phase oscillation element proposed according to the invention for producing the phase modulated alternating signal, constituting the injection or test signal, here in the form of an injection or test voltage Uv, and applied to the electrical network 1 containing the parallely connected generators 30 (FIG. 4). The phase oscillation element comprises a phase modulation circuit embodying a supply source 4 from which there is derived the injection or test voltage Uv. The source 4 may be assumed to be operating at the network frequency, although, as mentioned, other frequencies can be employed. Using a supply source 4 at the operating frequency constitutes a convenient means for producing the injection voltage Uv. The injection signal i.e., the injection voltage Uv is coupled into the electrical system i.e., the object 1 to be protected, here assumed to be the electrical network, and ground by means of a working or detection resistor 2 and the injection signal-transformer 3. This injection signal-transformer 3 will be seen to have two primary windings 5 and 6 and a secondary winding 3a. The secondary winding 3a is connected between ground and the object 1 to be protected by means of the working resistor 2. On the other hand, the two primary windings 5 and 6 can be connected with the supply source 4 by means of two electronic switches 7 and 8, here shown in the form of triacs. The one terminal or pole 4a of the source 4 is connected with the common node or junction 20 of both primary windings 5 and 6 of the transformer 3, whereas the other terminal 4b of such source 4 is connected via the triacs 7 and 8 with the free end or other connection point or terminal 5a and 6a of such primary windings 5 and 6 respectively. Both of the electronic switches 7 and 8 i.e., the triacs, are alternately opened at their control gates or electrodes, generally indicated by reference characters 7a and 8a respectively, by means of the output signals of an oscillator 9. This oscillator 9 alternately opens the triacs 7 and 8 at a desired predetermined switching frequency ($1/t_1$), wherein $t_1$ advantageously constitutes a predetermined triggering or firing time of the triacs and a remaining safety time, as will be explained by way of example more fully hereinafter, whereby the injection voltage Uv has its phase shifted by the switching frequency between 0° and 180° i.e., the phase positions are out of phase by 180° with respect to one another. Reference character or symbol Inv constitutes an inverter or reversing means for obtaining the correct control signal phases.

Figure 3:
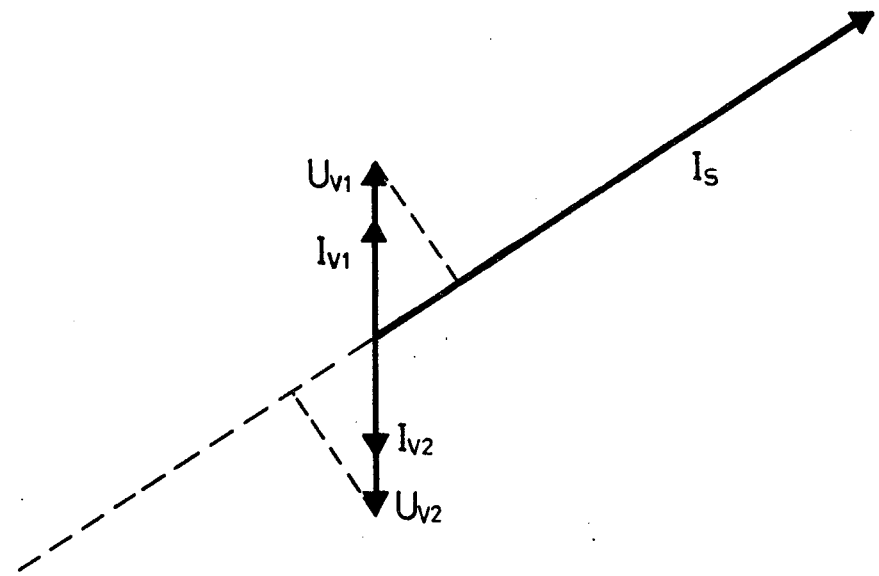
FIG. 3 graphically illustrates the two phase positions of the injection voltage Uv.

Turning attention to FIG. 3 the two phase positions of the injection or test voltage Uv have been designated by reference characters $Uv_1$ and $Uv_2$. In the case of an insulation fault at the protected object 1 a current Iv ($Iv_1$, $Iv_2$ in FIG. 3) which is derived from the injection voltage Uv flows through the working resistor 2 and at that location produces a voltage drop defining a response voltage which is applied to the primary winding 12a of the insulation or response transformer 12. This response voltage in the form of such voltage drop is delivered by means of the secondary winding 12b of the response signal-transformer 12 (FIG. 2) to an input x of a multiplier 11. At the other input y of the multiplier 11 there appears the voltage Uv as a reference signal, and which may be directly supplied by the source 4. However, in order to avoid any effect of disturbance currents by the impedances of the injection signal-transformer 3, it is possible to also separately synchronously generate the reference signal. This is so for the circuit arrangement of FIG. 2, where the reference signal generator together with the oscillator is shown in a single block 9.

The measurement current flowing through the working resistor 2 is composed of a useful signal (response signal) Iv and an undefined disturbance signal Is. The disturbance signal Is can be of random frequency, phase position and within certain limits also amplitude. The product at the output z of the multiplier 11 can be expressed by the following: $B = Uv \times (Iv + Is) = Uv \cdot Iv + Uv \cdot Is$.

The part UvIs, when integrated over a random long time tg, equals null. Therefore, there is present at the resistor 2 the possibility of distinguishing between the response signal, here the useful current Iv, the amplitude of which is great only in the case of a ground short, and all possible disturbance currents Is. Integration is accomplished at the filter 13. The integration result i.e., the processed signal then can be beneficially employed to activate a suitable protective device, such as a relay, to shutdown the object 1 to be protected.

Tests carried out at a prototype circuit have found the following values to be advantageous by way of example:

Uv = 2% of the amplitude of the network phase voltage.

$t_1$ = 60 ms, wherein the triacs 7 and 8 are only fired for 45 ms, the remaining time 15 ms serves as a security or safety time in order to avoid simultaneous firing of both triacs by the disturbance currents. The predetermined switching frequency amounts to $1/t_1$ as previously explained.

13= filter of the 12th order (~50 dB).

Now in FIG. 4 there is shown the connection of the phase oscillation element, containing circuitry like in FIG. 2, incorporating the injection signal-transformer 3 by means of its secondary winding 3a with the parallel connected generators 30 of the electrical network 1. The injection signal e.g. the injection voltage Uv is coupled to the generators 30 to be protected by means of a delta-star wound transformer 40. In particular, the injection signal generator, here encompassing the secondary side 3a of the transformer 3, is connected to the open delta winding 14a of the transformer 14. In the exemplary embodiment under consideration, the amplitude of the injection voltage Uv amounts to approximately 2% of the amplitude of the phase voltage. The primary windings 5 and 6 of the injection signal-transformer 3 and the center node 20 are connected to circuitry, here simply shown in form of a block 80 to simplify the illustration, which contains the supply source 4, electronic switches 7, 8, inverter Inv, oscillator 9, multiplier 11 and evaluation means e.g. filter 13, as was heretofore explained for the embodiment of FIG. 2. At the measuring location A there is provided a current measuring device 90, for instance a current converter such as a transformer which delivers the measurement current Iv+Is to the circuitry 80 for processing and evaluation as heretofore explained.

The ground resistor Ra' is still necessary for ferroresonance reasons, but in comparison to the ground resistor Ra heretofore employed, as shown in FIG. 1, can be selected to be more high-ohmic. The useful current Iv produced by the injection voltage Uv is measured, as was heretofore the case, at location A. What is now decisive is that neither faults of the current measuring device 90 nor other disturbance currents at location A can affect the measurement. Consequently, the useful current Iv and thus also the injection voltage Uv can be selected to be extremely low. The current measuring device 90 e.g. transformer need no longer be fabricated from specialty cores, since the disturbance currents can be up to 100 times greater than the useful current Iv, without adversely affecting the measurement.

The aforementioned objectives, namely filtering a useful current out of a mixture of disturbance currents which, as previously explained, can be randomly configured within certain limits, is effectively solved with the teachings of the invention by using an injection voltage, advantageously at the network frequency, but oscillating in phase.

While there are shown and described present preferred embodiments of the invention, it is to be distinctly understood that the invention is not limited thereto, but may be otherwise variously embodied and practiced within the scope of the following claims. Accordingly,

What I claim is:

1. A method of detecting ground shorts in generators connected in parallel in an electrical network, wherein for detecting essentially completely a ground short at one of the parallely connected generators there are carried out the steps of:

modulating the phase of an alternating signal to produce an alternating injection signal;

delivering the alternating injection signal to the electrical network containing the parallely connected generators; and deriving from the electrical network a response signal corresponding to the alternating injection signal and indicative of the ground short at one of the parallely connected generators.

2. The method as defined in claim 1, further including the steps of:
   utilizing as the alternating signal an alternating voltage.

3. The method as defined in claim 1, wherein the phase modulation comprises the steps of:
   continuously switching the phase of the alternating signal forming the injection signal between two phase positions.

4. The method as defined in claim 3, wherein:
   the phase of the alternating signal forming the injection signal is switched between two phase positions in the sense of a phase oscillation.

5. The method as defined in claim 1, wherein:
   the alternating signal which is phase modulated is at the network frequency.

6. The method as defined in claim 1, further including the steps of:
   biasing the entire electrical network towards ground by means of the injection signal which is at the network frequency.

7. The method as defined in claim 1, wherein the phase modulation comprises the steps of:
   switching the phase of the alternating signal forming the injection signal between two phase positions which are opposite in phase to one another.

8. The method as defined in claim 7, including the steps of:
   performing phase switching of the alternating signal during switching periods amounting to about 60 ms.

9. The method as defined in claim 8, wherein:
   each of the switching periods encompasses a triggering time of about 45 ms and a remaining time constituting a safety time.

10. The method as defined in claim 1, wherein:
    the alternating signal is an alternating voltage, and
    the amplitude of said alternating injection voltage amounts to about 2% of the network phase voltage.

11. An apparatus for detecting ground shorts in generators connected in parallel in an electrical network comprising:
    a transformer having two primary windings and a secondary winding for supplying an alternating injection voltage;
    said secondary winding serving to apply the injection voltage to the electrical network containing the parallely connected generators;
    a source for producing the injection voltage;
    said source having a pair of terminals;
    said source being connected at one terminal with a junction point of both primary windings of the transformer;
    two electronic switch means having inputs and outputs;
    said source being connected at its other terminal in parallel with the inputs of said two electronic switch means;
    a respective output of each of said electronic switch means being connected with the other terminal of a respective one of said primary windings;

an oscillator delivering an output signal for alternately opening said electronic switch means;
an insulation transformer having a primary winding and a secondary winding;
a working resistor connected in parallel with the primary winding of said insulation transformer;
said secondary winding of said insulation transformer delivering a response voltage corresponding to the injection voltage and indicative of the ground short;
a multiplier having a first input and a second input;
said response voltage of the insulation transformer being delivered to the first input of said multiplier;
means for applying a voltage constituting a reference signal to the second input of the multiplier;
said multiplier having an output carrying an output signal;
a filter for carrying out an integration operation;
the output signal of the multiplier being delivered to the filter.

12. The apparatus as defined in claim 11, wherein:
said source operates at the network frequency.

13. The apparatus as defined in claim 11, wherein:
said voltage applying means delivers a reference voltage substantially equal to the network frequency.

14. The apparatus as defined in claim 11, wherein:
said voltage applying means delivers said injection voltage as said reference voltage at the second input of the multiplier.

15. The apparatus as defined in claim 11, wherein:
said voltage applying means supplies a separate signal which is generated essentially in synchronism with the injection voltage and which appears as said reference signal at the second input of the multiplier.

16. The apparatus as defined in claim 11, wherein:
said electronic switch means comprise triacs.

17. The apparatus as defined in claim 16, wherein:
the amplitude of said injection voltage amounts to about 2% of the network phase voltage.

18. The apparatus as defined in claim 17, wherein:
the triacs have switching periods amounting to about 60 ms.

19. The apparatus as defined in claim 16, wherein:
the triacs have switching periods amounting to about 60 ms;
said triacs being fired for about 45 ms and the remainder of the time serving as a safety time in order to prevent simultaneous firing of both triacs by disturbance currents.

20. The apparatus as defined in claim 11, further including:
directional relay means for measuring the useful current which flows in the presence of an insulation fault at the electrical network.

21. A method of detecting ground shorts in electrical devices connected in parallel in an electrical network, wherein for detecting essentially completely a ground short at one of the parallely connected electrical devices there are carried out the steps of:
modulating the phase of an alternating signal to produce an alternating injection signal;
delivering the alternating injection signal to the electrical network containing the parallely connected electrical devices; and
deriving from the electrical network a response signal corresponding to the alternating injection signal and indicative of the ground short at one of the parallely connected electrical devices.

22. A method of detecting ground shorts in electrical devices of an electrical network, especially parallely connected generators, wherein for detecting essentially completely a ground short at the electrical device there are carried out the steps of:
modulating by means of a modulation function the phase of an alternating signal to produce an alternating injection signal;
delivering the alternating injection signal to the electrical network containing the electrical devices at which there is to be detected any ground short;
deriving from the electrical network a response signal corresponding to the alternating injection signal;
demodulating the response signal to form a signal indicative of the ground short at the electrical device.

* * * * *